(12) United States Patent
Atkinson

(10) Patent No.: US 6,364,333 B1
(45) Date of Patent: Apr. 2, 2002

(54) LEAF SPRING TO AXLE ARTICULATING CONNECTOR

(76) Inventor: Charles Atkinson, 12875 Highway 138, Hesperia, CA (US) 92345

( * ) Notice: Subject to any disclaimer, the term of this patent is extended or adjusted under 35 U.S.C. 154(b) by 0 days.

(21) Appl. No.: 09/656,179

(22) Filed: Sep. 6, 2000

(51) Int. Cl.$^7$ ............................................. B60G 11/04
(52) U.S. Cl. ................................. 280/124.175; 267/52
(58) Field of Search ................... 280/124.175, 124.176, 280/124.17, 124.171, 124.172, 124.156, 682; 267/52

(56) References Cited

U.S. PATENT DOCUMENTS

| | | | |
|---|---|---|---|
| 1,416,797 A | * | 5/1922 | Deschamps ................. 267/52 |
| 1,930,465 A | * | 10/1933 | Bijur ......................... 184/7.3 |
| 2,624,593 A | * | 1/1953 | Stover ....................... 280/682 |
| 3,157,242 A | * | 11/1964 | Kozicki ............... 280/124.156 |
| 3,494,609 A | | 2/1970 | Harbers, Jr. |
| 3,588,141 A | * | 6/1971 | Honda et al. ......... 280/124.111 |
| 3,591,163 A | | 7/1971 | Anderson |
| 3,730,508 A | | 5/1973 | Marian et al. |
| 3,913,937 A | | 10/1975 | Longworth et al. |
| 4,227,716 A | | 10/1980 | Nordstrom |
| 4,519,590 A | | 5/1985 | Wells |
| 4,553,774 A | | 11/1985 | Malcolm |
| 4,684,110 A | | 8/1987 | Sale et al. |
| 4,801,129 A | | 1/1989 | Wells |
| 5,634,656 A | | 6/1997 | Banks |
| 5,950,971 A | | 9/1999 | Koumbis et al. |

* cited by examiner

Primary Examiner—J. J. Swann
Assistant Examiner—David R. Dunn
(74) Attorney, Agent, or Firm—Richard C. Litman

(57) ABSTRACT

An articulating connector installed between a solid axle and a leaf spring suspension in a vehicle, which provides for lateral angular articulation of the axle about an axis parallel to the longitudinal axis of the vehicle without twisting the leaf spring laterally. The result is greater articulation of the axle and elimination of spring binding, thereby providing more freedom of spring travel and a great reduction in interleaf friction in the spring. Shear stresses on the bolts securing the spring eyes to the vehicle chassis or frame are also greatly reduced, thereby greatly increasing the life of these components. The present connector is directed to use in vehicles having either rear or front solid axle systems, or both, suspended by generally longitudinally oriented leaf springs. The present connector may be applied to either overslung or underslung axles, and provides greater freedom of suspension articulation than was achievable in the past with such solid axle and leaf spring suspension systems. The result is greater vehicle versatility for off road use for off road enthusiasts and hobbyists, contractors, military vehicles, and any others who have occasion to operate vehicles equipped with solid axle and leaf spring type suspensions over extremely rough and uneven terrain.

17 Claims, 3 Drawing Sheets

LEAF SPRING TO AXLE ARTICULATING CONNECTOR

BACKGROUND OF THE INVENTION

1. Field of the Invention

The present invention relates generally to vehicle suspension systems, and more specifically to a connector installed between a longitudinal leaf spring suspension and the associated axle of the vehicle. The present connector includes a pivot axis normal to the elongate axis of the axle and generally parallel to the elongate axis of the spring, permitting the axle to move angularly and laterally without imposing torsional forces on the leaf spring, thereby eliminating lateral binding of the spring and corresponding reduction in spring rate and travel.

2. Description of the Related Art

While most motor vehicles are adapted for travel over relatively smooth surfaces with only occasional travel over speed bumps, driveway ramps, etc., a relatively large class of vehicles is adapted for travel over relatively rough and unimproved surfaces. Such vehicles are usually constructed as light trucks or sport utility vehicles, and generally have relatively large suspension travel in order to provide for use over rough and unimproved surfaces. While such vehicles have found favor among the general public for recreational purposes, they are also widely used by construction firms, the military, and other users as well.

The two most important considerations in the suspension action of such vehicles are total travel, i. e., the amount of movement from full compression ("bump") to full extension ("droop"), and articulation, i. e., the difference in travel extremes between diagonally opposite wheels or wheel assemblies at diagonally opposite corners of the vehicle. These characteristics are of critical importance in extreme terrain conditions, as obviously a wheel and tire which is not in contact with the underlying surface, is incapable of providing any tractive force (acceleration, braking, and/or steering) to propel and control the vehicle.

As a result, manufacturers and aftermarket suppliers alike have attempted to develop various solutions for these travel and articulation problems. It will be noted that as suspension travel is increased in any given vehicle, the problem of providing sufficient articulation becomes more critical. Greater suspension travel results in greater angularity in drive lines and axles relative to one another and to the vehicle chassis, creating an even greater problem in avoiding binding somewhere in the system.

This is particularly true in vehicles with solid axle systems, where the suspension elements (springs and shock absorbers) are connected between an axle which extends across the vehicle and the vehicle chassis or frame. While many vehicles adapted for rough terrain usage have independent suspensions with coil springs, a large number of such vehicles (particularly older vehicles) have solid axles (perhaps front and back) suspended by leaf springs, as this system has proven to be extremely durable and reliable.

However, such solid or straight axle drive and suspension systems are difficult to provide with sufficient articulation to correspond with the relatively large wheel travel which may be installed in the system, either by the manufacturer or by means of aftermarket or individually fabricated and installed components. While it is relatively straightforward to provide additional fender clearances, longer and/or taller springs, longer shock absorbers, etc., for increased suspension travel, this increased travel results in interference with the articulation of such solid axle and leaf spring suspension configurations. This is because as the axle articulates angularly and laterally relative to the vehicle chassis, e. g., with the left wheel raised and the right wheel lowered, the resulting angle of the axle produces an angular twist in the leaf spring assembly at each end of the axle.

These leaf spring assemblies are conventionally formed of a series of separate springs of different lengths, laminated together by a corresponding series of shackles or the like. As the distal ends of the spring are secured to the vehicle by lateral pivot bolts or pins, the distal ends maintain the angular orientation of the vehicle about their lateral pivot axes, while the center of the spring, which is bolted to the axle, is twisted to align with the lateral angle of the axle. It will be seen that this results in the twisting of the spring assembly, with resulting binding and resistance to spring travel and movement. It also places severe shear forces at the ends of the spring-to-chassis attachment bolts, leading to their early failure.

Accordingly, a need will be seen for a leaf spring to axle articulating connector which permits a solid axle to articulate angularly and laterally relative to the vehicle chassis, while simultaneously maintaining the linear alignment of the leaves of the leaf spring assembly at each end of the axle and their attachment points to the chassis. The present invention essentially comprises a longitudinally oriented pivot axis positioned between the center of the leaf spring assembly and its attachment to a solid or straight axle in a vehicle. The present invention thus allows full and complete angular movement of the axle relative to the longitudinal axis of the vehicle, while obviating any twisting forces in the leaf spring assembly. The present articulating connector may be used with front and rear wheel drive solid axle systems, with either overslung or underslung axle and spring assemblies.

A discussion of the related art of which the present inventor is aware, and its differences and distinctions from the present invention, is provided below.

U.S. Pat. No. 3,494,609 issued on Feb. 10, 1970 to Henry C. Harbers, Jr., titled "Leaf Spring And Axle Seats," describes a series of clamps and shims for rigidly securing a leaf spring assembly to a solid axle housing, to preclude misalignment of the axle relative to the spring and vehicle (i. e., "toe-in" and "toe-out"). The Harbers, Jr. attachments teach away from the present invention, as they are expressly configured to prevent any relative movement between the axle and the spring assembly.

U.S. Pat. No. 3,591,163 issued on Jul. 6, 1971 to Richard D. Anderson, titled "Mounting," describes a plate for attaching a traction bar to a leaf spring suspension for a solid axle housing. The mounting holes for the plate are punched or stamped from the plate, to form a series of noncircular, tapered holes and corresponding scrap components. Each of these scrap components is further modified by removing a portion thereof, which when the components are reassembled with the plate, provide bolt passages therethrough. The stamped scrap components may be oriented in their holes in the plate as desired, thereby positioning the bolt holes as required for different U-bolt and spring dimensions, etc. As in the Harbers, Jr. assembly, the Anderson device teaches away from any movement between suspension components and axle, and is further directed only to longitudinal shifting of the axle, rather than angular movement relative to the vehicle's horizontal axis.

U.S. Pat. No. 3,730,508 issued on May 1, 1973 to Daniel Marian et al., titled "Variable Offset Spring Mounting Block For Load-Bearing Vehicles," describes an assembly comprising a pair of mating blocks, one of which secures to the axle and the other of which secures to the leaf spring attachment point. The two blocks include mating teeth, holes and pins, or other means for adjusting their mating fit, thereby adjusting the longitudinal position of the axle relative to the spring and vehicle. As in the other devices of the related art discussed above, the Marian et al. device is a rigid assembly when installed, and does not provide for any movement between the axle and spring.

U.S. Pat. No. 3,913,937 issued on Oct. 21, 1975 to William F. Longworth et al., titled "Universal Axle Pad And Clamp Assemblies For Vehicle Suspensions," describes an assembly for securing a solid axle and leaf spring assembly together. The assembly includes indicia for aligning the axle about its elongate axis, for adjusting the pinion angle of the axle. However, once the angle has been selected, the axle clamps are permanently and immovably welded to the axle, and the assembly is immovably bolted to the spring by means of a spring clamp and perch. Thus, the Longworth et al. assembly does not provide for any relative movement between the axle and its attachment to the leaf spring in any dimension whatsoever, whereas the present invention specifically provides for lateral articulation between the spring assembly and the axle to preclude binding of the spring assembly.

U.S. Pat. No. 4,227,716 issued on Oct. 14, 1980 to Sigurd A. M. Nordstrom, titled "Arrangement For Attaching Spring Assemblies To Vehicle Axle Housings," describes an assembly comprising an opposed pair of brackets which are welded to opposite sides of a solid axle housing. Lugs or ears extending from the brackets provide for the attachment of the bracket and axle assembly to a leaf spring assembly. The Nordstrom assembly is thus more closely related to the assembly of the Longworth et al. '1937 U.S. Patent discussed above than to the present invention, due to the rigid, immovable mounting of the Nordstrom assembly and the lack of any provision for articulation between axle and spring, particularly angularly relative to the vehicle's longitudinal axis.

U.S. Pat. No. 4,519,590 issued on May 28, 1995 to Wayne E. Wells, titled "Axle Clamp For Filament Reinforced Synthetic Material Leaf Springs," describes a clamp assembly for positively securing such a leaf spring to an axle assembly. The Wells device specifically precludes any linear or angular movement of the axle relative to the spring, and thus is more closely related to the axle and spring securing means disclosed in the Harbers, Jr. '232, Longworth et al. '937, and Nordstrom '716 U.S. Patents discussed further above, than to the present invention with its provision for angular movement of the axle relative to the attached leaf spring in an axis parallel to the longitudinal axis of the vehicle.

U.S. Pat. No. 4,553,774 issued on Nov. 19, 1985 to George D. Malcolm, titled "Vehicle Suspension," describes an assembly in which the leaf spring assembly is captured between a beam or solid axle and an adjacent but spaced apart stub axle. Wedges are driven between the stub axle and the spring, to hold the spring securely against a spacer plate. Malcolm notes that the advantage of this assembly is that the spring is positioned closer to the axle, thus reducing relative movement and bending moments between the two components. Thus, Malcolm teaches away from the present invention, with its means providing angular articulation between the axle and associated leaf spring, with the assembly of the Malcolm U.S. Patent being more closely related to the disclosures of the Harbers, Jr. '232, Longworth et al. '937, Nordstrom '716, and Wells '590 U.S. Patents discussed further above, than to the present invention.

U.S. Pat. No. 4,684,110 issued on Aug. 4, 1987 to Robert F. Sale et al., titled "Leaf Spring Clamp With Attachment Means," describes an axle and leaf spring attachment assembly which is quite similar to that disclosed in the Wells '590 U.S. Patent discussed further above, and which bears a much closer resemblance to the Wells '590 device than to the present invention. (It is noted that Wells is shown as the second inventor in the Sale et al. Patent.) Accordingly, the points raised in the discussion of the Wells '590 U.S. Patent regarding the differences and distinctions between the device of that patent and the present invention, are seen to apply here as well.

U.S. Pat. No. 4,801,129 issued on Jan. 31, 1989 to Wayne E. Wells, titled "Leaf Spring Clamp With Attachment Means," describes yet another assembly more closely related to the devices disclosed in the '590 U.S. Patent to the same inventor and to the '110 U.S. Patent to Sales et al., discussed further above. The points raised in the discussion of those patents are accordingly seen to apply here as well, as none of these U.S. Patents provide for lateral articulation between the axle and leaf spring assembly to preclude lateral binding of the spring laminations, as provided by the present invention.

U.S. Pat. No. 5,634,656 issued on Jun. 3, 1997 to Raymond L. Banks, titled "Axle Alignment Assembly," describes an alignment adjuster added to an otherwise conventional solid axle perch between the axle and leaf spring assembly. The adjuster causes the axle perch to pivot about its conventional pivot point extending from the uppermost spring, about a vertical axis. However, the Banks assembly otherwise immovably secures the axle to the spring assembly and does not allow angular articulation of the axle relative to the spring about an axis parallel to the vehicle's longitudinal axis, as provided by the present assembly. It is also noted that the only movement allowed by the Banks device is during manual adjustment on a stationary vehicle, with the assembly being locked during vehicle motion. In contrast, the present device has no adjustment (other than perhaps conventional shims and the like), but permits fully automatic articulation of the axle relative to the spring during vehicle operation, unlike the Banks assembly.

Finally, U.S. Pat. No. 5,950,971 issued on Sep. 14, 1999 to Chris Koumbis et al., titled "Assembly For And Method Of Mounting A Suspension Member To An Axle Housing," describes an assembly for attaching an axle to a suspension arm, rather than to a leaf spring assembly. A clamp assembly is welded in place around the suspension arm, with an attachment assembly welded to the axle. The two assemblies are bolted together by a lateral bolt, with shims placed adjustably between one end of the assemblies permitting adjustment of the pinion angle of the axle, i. e., the angle of the axle about its elongate axis. Accordingly, the Koumbis et al. assembly is more closely related to the assembly of the Longworth et al. '937 U.S. Patent, discussed further above, than to the present invention.

None of the above inventions and patents, either singly or in combination, is seen to describe the instant invention as claimed

SUMMARY OF THE INVENTION

The present invention comprises an articulating connector for securing a solid, straight axle to a leaf spring assembly. The present connector includes a generally horizontal pivot axis normal to the elongate axis of the axle assembly, and generally parallel to the longitudinal axis of the vehicle. The present invention enables an axle to articulate angularly about an axis parallel to the longitudinal axis of the vehicle without laterally twisting the leaf spring to which it is attached, thereby precluding binding of the leaf spring and resistance to spring and axle travel. The result is greater freedom of articulation for the suspension assembly of a vehicle equipped with such a straight axle and leaf spring suspension system.

The present articulating connector may be applied to the rear drive axle system of vehicles equipped with such an axle and suspension system, and/or may be applied to a front axle assembly comprising the same type of axle and suspension system. The present articulating connector is particularly valuable to off road vehicle enthusiasts having vehicles with solid axle and leaf spring suspensions, who have occasion to take their vehicles over very rough and unimproved surfaces. The present articulating connector will also find great utility in military vehicles incorporating suspensions with which it is compatible, as well as vehicles used by contractors and others who may have occasion to take their vehicles off road and over relatively rough and unimproved terrain.

Accordingly, it is a principal object of the invention to provide an improved leaf spring to axle articulating connector, providing lateral angular articulation of a solid axle about an axis parallel to the longitudinal axis of the vehicle without applying lateral twisting forces to the leaf spring assembly to which the axle is attached, thereby increasing suspension articulation for the vehicle and obviating spring binding.

It is another object of the invention to provide an improved leaf spring to axle connector having a generally longitudinally oriented pivot axis disposed between the axle and the leaf spring assembly, providing lateral articulation of the axle relative to the spring.

It is a further object of the invention to provide an improved leaf spring to axle connector providing fixed alignment of the axle normal to the elongate axis of the spring assembly.

An additional object of the invention is to provide an improved leaf spring to axle connector including lubrication means therefor, and provision for installation with both underslung and overslung axles.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a leaf spring to axle articulating connector, installed between the axle and leaf spring assembly on a vehicle equipped with such a suspension system. The present invention allows the solid axle housing to articulate, i.e., to lift higher on one side than the other relative to the vehicle lateral axis, without imposing a lateral twisting force upon the leaf spring assemblies at each end of the axle. This eliminates spring bind due to the twisting of the springs, which allows much more free spring and suspension travel for the vehicle.

A typical section of a solid axle A is illustrated in FIGS. 1 through 4 of the drawings, with the term "solid axle" being understood to refer either to a drive axle comprising an axle housing with axle driveshafts extending to either side thereof from a generally central differential, or to a non-driven axle comprising a simple I-beam, tube, or other structure. These solid axles A are commonly secured to the vehicle chassis or frame by a leaf spring assembly S comprising one or more spring leaves disposed toward each outer or lateral end of the axle A. This type of vehicle suspension system is very simple and rugged and is found on many different types of conventional vehicles, e. g., the Ford Bronco (tm) and other light trucks, sport utility vehicles, etc.

Figure 1:
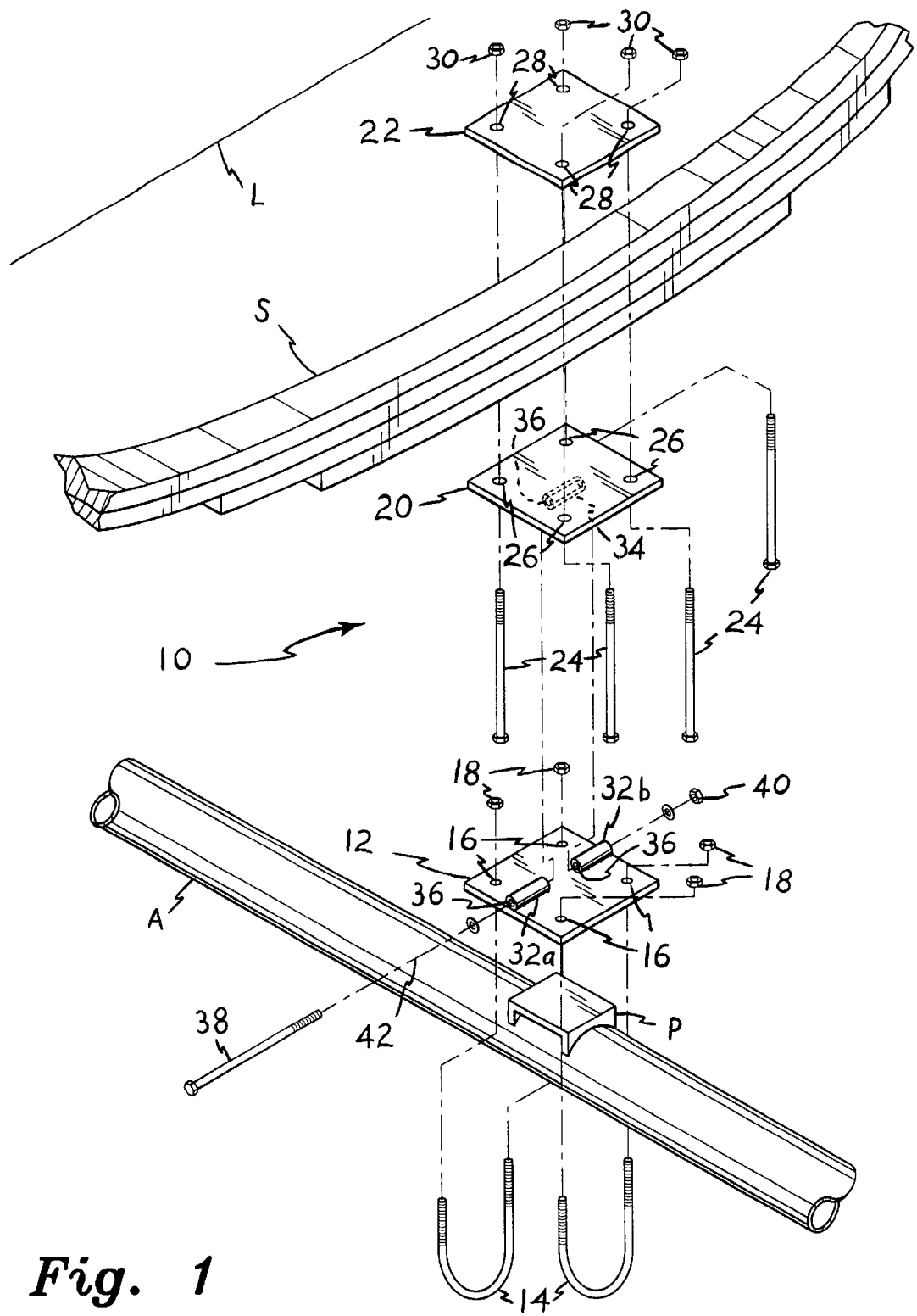
FIG. 1 is an exploded perspective view of the present articulating connector and broken away axle and leaf spring components, showing their assembly with one another.

An exploded perspective view of such a solid axle and leaf spring assembly incorporating the present articulating connector is illustrated in FIG. 1 of the drawings. The connector 10 essentially comprises a first or axle plate component 12 which is rigidly and immovably affixed to the axle A, as by a pair of U-bolts 14 which pass through appropriately spaced holes 16 and are secured by cooperating nuts (e. g., lock nuts, etc.) 18. Preferably, the axle A is provided with a flat spring perch P to provide a solid mounting surface to preclude rotation of the axle relative to the spring S, or relative to the first or axle plate connector component 12 when the axle plate 12 is secured to the axle A. It will be seen that other attachment means may be used for securing the first or axle plate component 12 to the axle A as desired, e. g., welding, etc.

A second or leaf spring connector component 20 is rigidly and immovably affixed to the leaf spring assembly S, in the location where the spring assembly S would otherwise normally be attached to the spring perch P of the axle A. The second or spring attachment connector component 20 is secured to the spring assembly S by sandwiching the spring S between the leaf spring attachment component 20 and a clamping plate 22, disposed to the opposite side of the center of the spring assembly S from the second or leaf spring connector component 20. A series of bolts 24 are passed through appropriately spaced holes 26 in the spring attachment plate 20 and holes 28 in the clamping plate 22, with cooperating nuts 30 (lock nuts, etc.) used to secure the two plates 20 and 22 to each side of the spring assembly S. While welding is not a suitable means for securing the second plate 20 to the spring assembly S due to changes in the metallurgy of the spring S which would be caused by heating and adulterating with other metals during the welding process, other means may be used to secure the second plate 20 to the spring S, such as appropriately configured squared U-bolts and shackles (not shown), etc.

Each of the two components or plates 12 and 20 includes means for pivotally connecting the two plates 12 and 20 together between the axle A and spring assembly S. Each of the plates 12 and 20 has at least one pivot pin sleeve extending therefrom (welded, etc.), e. g., a pair of such sleeves 32a and 32b extending from the first component or plate 12 and a single sleeve 34 extending from the second component or plate 20.

The two first sleeves 32a, 32b are aligned on the first plate 12 to be concentric with one another, with the second sleeve 34 also being concentric with the first two sleeves 32a, 32b to define a pivot pin passage 36 when the two plates 12 and 20 are assembled together by a bolt 38 (shoulder bolt, etc.) inserted through the sleeves 32a, 32b, and 34 and secured by a nut 40 (lock nut, etc.). The result is a hinge-like configuration, with the two plates 12 and 20 pivoting relative to one another about the pivot pin passage 36 and bolt 38. It will be seen that other first and second sleeve configurations may be provided as desired, e. g. a single sleeve extending from the first plate with two sleeves extending from the second sleeve to capture the first sleeve therebetween upon assembly, or multiple intermeshing sleeves extending from each plate, etc.

When the two plates 12 and 20 are secured respectively to the axle A and spring assembly S as shown in the drawing Figures, it will be seen that the sleeves 32a, 32b, and 34 also define a horizontal pivot pin axis 42, which is normal to the elongate lateral axis of the axle A when installed in a vehicle, and parallel to the conventional longitudinal axis L of the vehicle, generally as shown in FIG. 1 of the drawings. Thus, the axle A is free to articulate or pivot angularly and laterally about the longitudinal pivot pin axis 42 without twisting or biasing the leaf spring assembly S with the resulting spring binding and reduction in spring rate which would otherwise occur.

Figure 2:
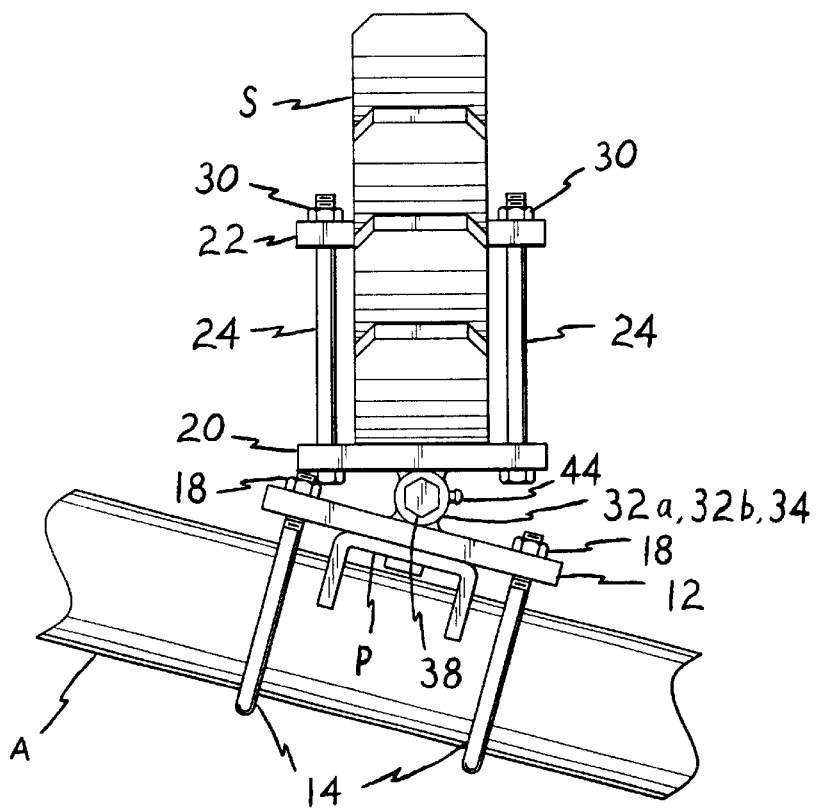
FIG. 2 is a front elevation view of the assembled components of FIG. 1, showing the freedom of axle articulation provided for the suspension equipped with the present connector.

FIG. 2 provides an end elevational view (i. e., from the direction of the front or rear end of the vehicle upon which the present articulating connector is used) of the completed assembly shown in FIG. 1. The articulation about a longitudinal pivot pin axis provided by the present invention, allows the axle A to articulate or tilt laterally relative to the remainder of the vehicle and more importantly, relative to the leaf spring assembly S. Thus, all of the leaves of the spring assembly S remain in alignment with one another, as is clearly shown in FIG. 2. This permits the leaves to move smoothly relative to one another, providing the same spring rate and ride as is achieved when both sides of the axle A are deflected equally, with no lateral bias or twisting applied to the leaf spring assembly S.

Figure 3:
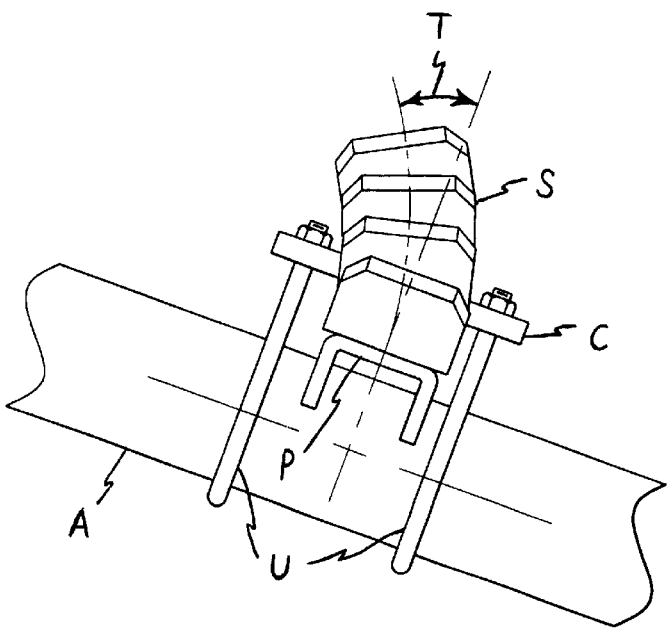
FIG. 3 is a front elevation view of a prior art solid axle and leaf spring assembly, illustrating the immovable attachment between spring and axle and resultant spring binding during axle articulation.

In contrast, the prior art assembly shown in FIG. 3 clearly shows the problem which is overcome by the present invention. In FIG. 3, the leaf spring assembly S is clamped directly to the spring perch P of the axle A by a pair of U-bolts U and a spring clamp plate C; these are all conventional components. When one wheel of the axle A is raised relative to the opposite wheel, thus causing the axle A to articulate or twist as shown in FIG. 3, the center of the spring assembly S remains clamped securely to the axle A. However, the upper ends of the spring assembly S remain attached to the vehicle chassis, which is at an angle to the axle A. This results in the upper ends of the spring assembly S developing the same twist angle T relative to the area of the spring assembly attached to the axle A, as shown in FIG. 3.

This lateral twisting of the leaf spring assembly, as shown in the prior art drawing of FIG. 3, results in binding of the spring shackles (not shown, for clarity in the drawing Figure) and corresponding reduction in spring rate as the leaf spring elements encounter resistance to relative movement due to the binding and lateral twist of the assembly. In effect, this produces a higher spring rate for the spring assemblies at both sides or ends of the axle A, reducing ride quality and also producing a stiffening effect which works against the articulation of the axle, in a manner similar to that of an antiroll bar or sway bar affixed to the axle and chassis assembly. Generally speaking, such antiroll devices are not desired in off road vehicles, due to the need for extreme articulation of the wheels in extremely rough conditions. The stiffening effect of the spring twist encountered in prior art systems, results in a limiting of wheel travel and subsequent lifting of at least one wheel from the underlying surface, thus reducing tire grip for acceleration, braking, and/or steering.

The present articulating connector overcomes this problem, by allowing the axle A to move angularly and laterally relative to the spring assembly S, while retaining positive attachment in all other axes, as is required for such an assembly. With spring travel and. spring rate being unimpeded by spring binding, the axle A is free to travel and articulate to the limits of the suspension system, thus enabling all tires of the vehicle to remain in contact with. the underlying surface to the limits of the vehicle.

Figure 4:
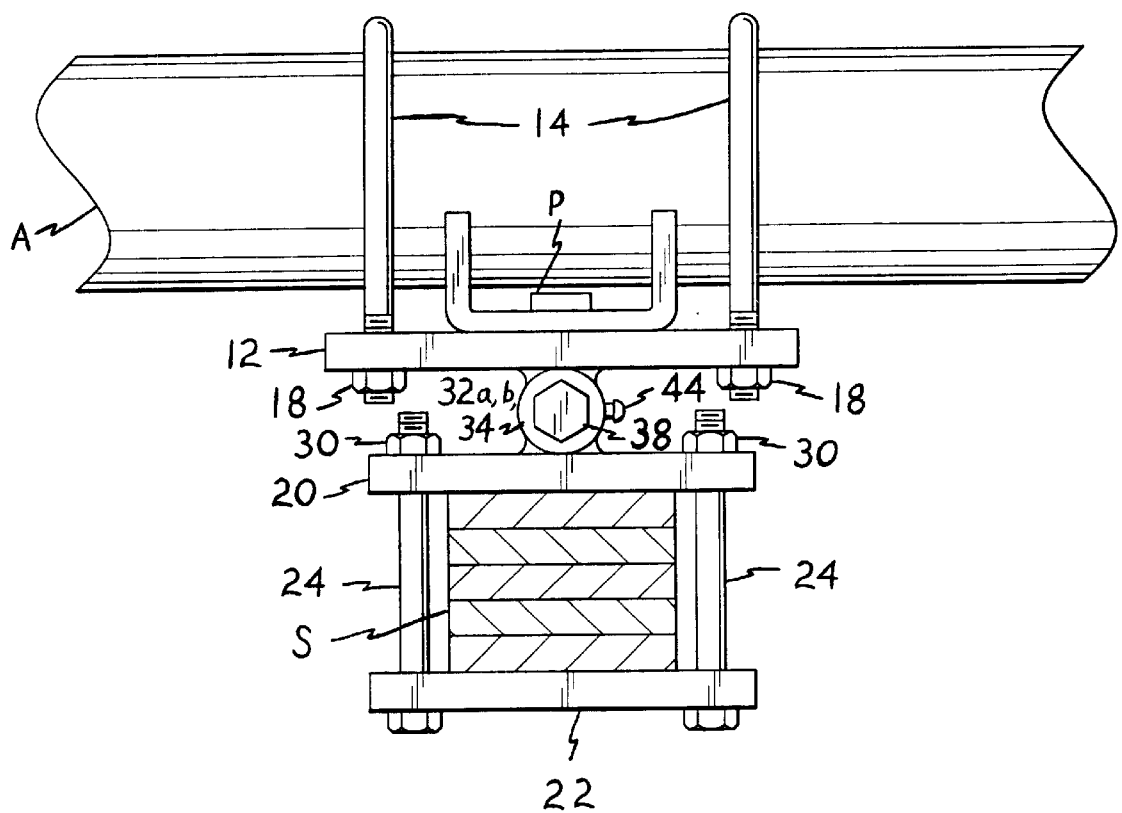
FIG. 4 is a front elevation view of an alternative embodiment assembly wherein the axle is overslung above the spring.

To this point, the present connector has been shown applied to an underslung type system, where the axle A is attached beneath the spring assembly S, in FIGS. 1 and 2 of the drawings. However, the present invention is equally adaptable to installation in vehicles having overslung axles, i. e., where the axle A passes over the spring assembly S, as shown in FIG. 4 of the drawings. It will be seen that all of the components illustrated in FIG. 4 are individually essentially identical to those of FIGS. 1 and 2, and thus corresponding reference characters are used. However, the assembly of the components shown in FIG. 4 is different from the arrangement shown in FIGS. 1 and 2, being essentially inverted in order to accommodate assembly with such an overslung axle A.

Due to normal asymmetric suspension travel as the wheel at one side of the axle encounters an irregularity not encountered by the opposite side, at least some articulation of the axle relative to the spring is an almost constant event while a vehicle is in motion. This would result in a certain amount of friction and wear between the pivot sleeves 32a, 32b, 34 and the pivot bolt 38, unless some lubrication means is provided. Accordingly, a grease fitting 44 ("Zerk," tm, etc.) is provided in one of the sleeves 32a, 32b, 34 (preferably in the central sleeve 34), to provide a grease flow path from outside the connector to the interface between the sleeves 32a, 32b, 34 and the bolt or pin 38. Such a fitting 44 is illustrated in FIGS. 2 and 4 of the drawings. Alternatively, some form of sealed lubrication could be provided, as is known conventionally in various vehicle suspension components.

While only a single axle and spring assembly is shown in each of the drawing Figures of the present disclosure, it will be readily understood by those skilled in the art that such suspension systems are employed at both ends of an axle, and are essentially left to right mirror images of one another. Accordingly, the present articulating connector is installed in pairs to a single axle assembly, with one connector installed between each spring assembly and its corresponding attachment to the axle adjacent the wheel at each end of the axle. While it is certainly possible to install a single articulating connector of the present invention between a single spring assembly and an axle, such a single installation is not at all desirable due to the unbalanced effective spring rates which would occur between the two axle ends.

While the present articulating connector is preferably installed in pairs between a leaf spring assembly and an axle at. each end of the axle, as noted above, it will be seen that certain specialized vehicles may incorporate more than two leaf spring assemblies on a single axle. For example, a very large or heavy vehicle, or one requiring "helper" springs, may incorporate two or more laterally spaced leaf spring assemblies installed at each end of an axle. The present articulating connector may be installed between each of the leaf spring assemblies and the axle in such EL suspension configuration, with the benefits of the present: connector being even more pronounced in such a situation due to the elimination of the spring binding which would occur in such a multiple leaf spring suspension system with a single axle.

It should also be noted that the present connector is not limited to the angles shown in the drawings, but may be constructed to provide even greater angles of articulation as desired. For example, rather than welding the pivot pin sleeves directly to their respective axle and spring attachment plates, they may be welded or otherwise attached to spacers or the like, which are in turn welded or otherwise secured to the plates. Alternatively, larger diameter sleeves and pivot pins may be provided.

Another means of providing additional spacing and angular articulation, is by countersinking the bolt holes in the spring attachment plate and using flat head bolts in the countersunk holes. An equivalent means of providing a spring attachment plate surface free of protrusions, is by using threaded studs affixed through the spring attachment plate to eliminate the protruding heads of bolts or the like through the plate. Also, the axle attachment plate may be made wider than the spring attachment plate, so that the threaded ends of the U-bolts used to attach the axle to the axle attachment plate extend beyond the edges of the spring attachment plate to provide additional room for articulation between the two plates. Any of these modifications will result in greater spacing between the plates, and greater maximum angles of articulation. It will be seen that any of the above alternatives providing additional clearance between the two plates for greater angular articulation, may be applied to either the underslung axle assembly of FIGS. 1 and 2, or to the overslung axle assembly shown in FIG. 4 of the drawings.

In summary, the present articulating connector invention provides a much needed improvement in solid axle and leaf spring type vehicle suspensions. The elimination of the chronic problem of leaf spring bind during axle articulation, and subsequent resistance to further articulation and effective stiffening of spring rates, is solved by the present invention. The result is a device which will find great favor among owners of vehicles equipped with solid axle and leaf spring suspension systems, whether at the driven or nondriven, front or rear axles of the vehicle. The present articulating connector allows greater axle articulation and assures that all of the tires of the vehicle will remain in contact with the underlying surface where even greater surface irregularities are encountered, thus providing even greater versatility and reliability in even the roughest terrain for a vehicle so equipped.

It is to be understood that the present invention is not limited to the embodiments described above, but encompasses any and all embodiments within the scope of the following claims.

I claim:

1. A leaf spring to axle articulating connector for forming an articulating connection between a solid axle and a leaf spring suspension assembly, the connector comprising:

a first component adapted for being rigidly and immovably attached to a solid axle, said first component comprising an axle plate adapted for being bolted to a spring perch on the solid axle;

a second component adapted for being rigidly and immovably attached to a leaf spring assembly mounted to a vehicle, said second component comprising a spring plate adapted forbeing) a to a longitudinal center of the leaf spring assembly; and connecting means for connecting said first component and said second component pivotally together; and wherein said connecting means defines a generally horizontal pivot axis normal to the solid axle for lateral angular articulation of the solid axle relative to the leaf spring assembly about the pivot axis and parallel to a longitudinal axis of the: vehicle without also defining a generally horizontal pivot axis parallel to the solid axle, whereby the solid axle articulates laterally without twisting the leaf spring assembly.

2. The articulating connector according to claim 1, wherein said connecting means further includes:

at least one pivot pin sleeve extending from said first. component and from said second component;

each said pivot pin sleeve of said first component and said. second component being aligned concentrically with one another and. defining a pivot pin passage therethrough when said first component and said second component are assembled together; and pivot pin means installed through each said pivot pin sleeve of said first component and said second component, said pivot pin means securing said first component and said second component hingedly together.

3. The articulating connector according to claim 2, wherein said pivot pin means comprises a shoulder bolt with a cooperating nut lockingly secured thereto for retaining said shoulder bolt within. said pivot pin passage.

4. The articulating connector according to claim 2 further including at least one grease fitting affixed to at least one said pivot pin sleeve, for applying lubrication to said pivot pin passage.

5. The articulating connector according to claim 1, wherein said first component is disposed below said second component on an underslung axle installation.

6. The articulating connector according to claim 1, wherein said first component is disposed above said second component on an overslung axle installation.

7. In a vehicle having a longitudinal axis, a leaf spring to axle articulating connector in combination with a solid axle and a leaf spring suspension assembly, comprising:

a solid axle having a spring perch mounted thereon;

at least one leaf spring assembly having a longitudinal center, the leaf spring assembly being adapted for attachment to the vehicle;

a first component rigidly and immovably attached to said solid axle, said first component of said connector comprising an axle plate bolted to the spring perch of said axle;

a second component rigidly and immovably attached to said leaf spring assembly, said second component comprising a spring plate bolted to the center of said leaf spring assembly; and connecting means for connecting said first component and said second component pivotally together;

wherein said connecting means defines a generally horizontal pivot axis normal to said axle for lateral angular articulation of said axle relative to said leaf spring assembly about said pivot axis and parallel to the longitudinal axis of the vehicle without also defining a generally horizontal pivot axis parallel to the solid axle, whereby the solid axle articulates laterally without twisting the leaf spring assembly.

8. The articulating connector according to claim 7, wherein said connecting means further includes:
- at least one pivot pin sleeve extending from said first component and from said second component;
- each said pivot pin sleeve of said first component and said second component being aligned concentrically with one another and defining a pivot pin passage therethrough when said first component and said second component are assembled together; and
- pivot pin means installed through each said pivot pin sleeve of said first component and said second component, said pivot pin means securing said first component and said second component hingedly together.

9. The articulating connector according to claim 8, wherein said pivot pin means comprises a shoulder bolt with a cooperating nut lockingly secured thereto for retaining said shoulder bolt within said pivot pin passage.

10. The articulating connector according to claim 8, further including at least one grease fitting affixed to at least one said pivot pin sleeve for applying lubrication to said pivot pin passage thereof.

11. The articulating connector according to claim 7, wherein said axle is disposed below said leaf spring in an underslung axle installation.

12. The articulating connector according to claim 7, wherein said axle is disposed above said at least one leaf spring in an overslung axle installation.

13. A leaf spring to axle articulating connector in combination with a motor vehicle having a solid axle and at least: one leaf spring suspension assembly therefor, comprising:
- a motor vehicle having a longitudinal axis;
- a solid axle having a spring perch mounted thereon;
- at least one leaf spring assembly having a longitudinal center, said leaf spring assembly being mounted to said motor vehicle;
- a first component rigidly and immovably attached to said solid axle, said first component comprising an axle plate bolted to the spring perch;
- a second component rigidly and immovably attached to said leaf spring assembly, said second component comprising a spring plate bolted to the center of said leaf spring assembly; and
- connecting means for connecting said first component and said second component pivotally together;
- wherein said connecting means defines a generally horizontal pivot axis normal to said axle for lateral angular articulation of said axle relative to said leaf spring assembly about said pivot axis and parallel to the longitudinal axis of said vehicle without also defining a generally horizontal pivot axis parallel to the solid axle, whereby the solid axle articulates laterally without twisting the leaf spring assembly.

14. The vehicle, solid axle, leaf spring suspension assembly, and articulating connector combination according to claim 13, wherein said connecting means further includes:
- at least one pivot pin sleeve extending from said first component and from said second component;
- each said pivot pin sleeve of said first component and said second component being aligned concentrically with one another and defining a pivot pin passage therethrough when said first component and said second component are assembled together; and
- pivot pin means installed through each said pivot pin sleeve of said first component and said second component, said pivot pin means securing said first component and said second component hingedly together.

15. The vehicle, solid axle, leaf spring suspension assembly, and articulating connector combination according to claim 14, wherein said pivot pin means comprises a shoulder bolt with a cooperating nut lockingly secured thereto for retaining said shoulder bolt within said pivot pin passage.

16. The vehicle, solid axle, leaf spring suspension assembly, and articulating connector combination according to claim 14, further including at least one grease fitting affixed to at least one said pivot pin sleeve of said connector, for applying lubrication to said pivot pin passage thereof.

17. The vehicle, solid axle, leaf spring suspension assembly, and articulating connector combination according to claim 13, wherein said axle and said leaf spring suspension assembly comprise a suspension system selected from the suspension systems consisting of underslung axle installations and overslung axle installations.

* * * * *